(12) United States Patent
Nalla et al.

(10) Patent No.: US 10,970,454 B2
(45) Date of Patent: *Apr. 6, 2021

(54) SCALABLE CONNECTIVITY VERIFICATION USING CONDITIONAL CUT-POINTS

(71) Applicant: INTERNATIONAL BUSINESS MACHINES CORPORATION, Armonk, NY (US)

(72) Inventors: Pradeep Kumar Nalla, Sheffield (GB); Raj Kumar Gajavelly, Andhra Pradesh (IN); Jason Baumgartner, Austin, TX (US); Raja Bilwakeshwar Ivaturi, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,596

(22) Filed: Jan. 6, 2020

(65) Prior Publication Data

US 2020/0143101 A1  May 7, 2020

Related U.S. Application Data

(63) Continuation of application No. 15/922,272, filed on Mar. 15, 2018, now Pat. No. 10,579,770.

(51) Int. Cl.
*G06F 30/398* (2020.01)
*G06F 30/34* (2020.01)
*G06F 119/12* (2020.01)

(52) U.S. Cl.
CPC .......... *G06F 30/398* (2020.01); *G06F 30/34* (2020.01); *G06F 2119/12* (2020.01)

(58) Field of Classification Search
CPC .............................. G06F 30/398; G06F 30/34
(Continued)

(56) References Cited

U.S. PATENT DOCUMENTS 6,247,154 B1  6/2001 Bushnell et al.
7,159,201 B2  1/2007 Moondanos et al.
(Continued)

OTHER PUBLICATIONS

IBM "List of IBM Patents or Patent Applictions Treated as Related", (Appendix P), Filed Jan. 6, 2020; 2 pages.

*Primary Examiner* — Sun J Lin
(74) *Attorney, Agent, or Firm* — Cantor Colburn LLP; Erik Johnson

(57) ABSTRACT

Invention disclosed herein is a method for performing connectivity verification of an integrated circuit device. In embodiments of the invention, the method includes creating a directed graph representation of the integrated circuit device. The method can further include determining target gates referred to as trace signals within the integrated circuit device. The method can further include creating a hierarchical representation of trace signals and determining nested trace signals. The method can further include determining one or more locations for cut points for non-nested trace signals. Thereafter, performing connectivity verification using the one or more locations for cut points. Finally improving scalability of the connectivity verification by utilizing hierarchical decomposition embodiment of the invention.

20 Claims, 11 Drawing Sheets

(58) Field of Classification Search
USPC .................................. 716/106, 108, 110, 111
See application file for complete search history.

(56) References Cited

U.S. PATENT DOCUMENTS

| | | |
|---|---|---|
| 7,322,017 B2 | 1/2008 | Baumgartner et al. |
| 7,620,947 B2 | 11/2009 | Krishnaswamy |
| 8,316,345 B2 | 11/2012 | Gulwani et al. |
| 9,576,094 B2 | 2/2017 | Chuang et al. |
| 9,734,278 B1 | 8/2017 | Purri et al. |
| 10,579,770 B2 * | 3/2020 | Nalla et al. ........... G06F 30/398 |
| 2005/0005251 A1 | 1/2005 | Moondanos et al. |
| 2006/0129958 A1 | 6/2006 | Raymond et al. |
| 2016/0055270 A1 | 2/2016 | Chuang et al. |
| 2019/0286782 A1 | 9/2019 | Nalla et al. |

* cited by examiner

```
map<net, Graph*>  nodeDependencyMap = {empty};
Graph global_graph = {empty}

Detect_Overlap_Trace_Signals (set trace_signals) {
      for each trace signal "tr" in trace_signals {
            Graph  g = create_trace_sig_dependency_graph (tr);
            Add g to global_graph;
            connect_source(root, global_graph);
      }
}
```

FIG. 3

```
Graph g   create_trace_sig_dependency_graph (net "n")  {
          if (visited (n) )  {
                return  nodeDependencyMap[n];
          } else {
                markAsVisited (n);
          }
          // Reached a primary output, which can't be a trace signal
          if (n is an OUTPUT_PORT  or n is trace bus endpoint) {
                nodeDependencyMap[n] = NULL;
                return NULL;
          }

Graph  G = {empty};
          for each fanout net "n1" of  n {
                // Capture trace signal dependencies for fanout of n
                Graph  g1 =  create_trace_sig_dependency_graph (n1);
             Add g1 to G;
          }
          // If n is a trace a signal, form edges to other trace signals in
its fanout
          if (trace_signals.exists(n)) {
                    status = connect_source(n,  G);
          }

// else just propagate fanout trace signals
            nodeDependencyMap[n] = G;
            return G;
}!
```

FIG. 4

```
Bool connect_source(net n, Graph G) {
    add node "n" to G
    for each root node "r" in graph G {
        add edge from n to "r"
    }
}
```

FIG. 5

```
abstractionBasedConnectivityVerification (Template T) {
      // Populate trace signal instance table
      trace_signals t_set = hierTraverse (T);
      Graph *g = Detect_Overlap_Trace_Signals (t_set);

// For each mode condition we check for reachability of trace signals
     if (approach == method1) {
       for each connected node "tr" to "ROOT" {
          if (not cutPointAlreadyCreated(tr) ) {
               createCutPoint(tr, netlist);
              }
          }
      } else { // Method 2: For all the mode conditions
          for each node "tr" in graph {
             if (not connectedToRoot("tr")) {
                 // Create conditional cut point
                 tr_pi = createStutterPI();
                 tr_enable = createNewPI();
              new_tr = mux (tr_enable, tr_pi, tr);
                 enableMap[tr] =  tr_enable;
             } else {
                createCutPoint(tr, netlist);
             }
          }
     }
     cover_enable = createNewChickenSwitch();
     for each mode signal "m"  {
         // Create conditional cut point on each mode signal
         new_mode = createNewChickenSwitch();
         orig_m = m;
         // if cover_enable then original m otherwise new_mode
         m = mux (cover_enable, orig_m, new_mode);
     }
     if (approach == method1) {
         for each mode condition "m" {
             latch = create_new_latch(); AND_out = cover_enable AND latch;
             next(latch)  = AND_out;  init(latch) = 1;
             // Create FAIL property for all the bits of debug bus
           assert ( (debug_bus (0 to n) == expected_bus (0 to n))
                          AND m AND (not AND_out) );   // FAIL
verification
                cover (m AND AND_out); // COVER verification
         } // end for loop
     }
```

FIG. 6A

```
else { // Method 2
            for each trace signal "tr" {
                signal r = NULL;
                for each mode condition "m" {
             if ("tr" is involved in this mode condition "m") {
                        bit b = expectedBit(m, tr);
                        check = (debug_bus(b) == expected_bus (tr) )
AND m;
                    if (!r) { r = check } else { r = r  OR check };
                    }
                } // for each mode condition
                // FAIL verification - overridden mode signals propagated
                if (not connectedToRoot (tr) ) {
                    enable = enableMap[trace_sig];
                oneHot = createOneHot(enable, tr, enableMap);
                latch = create_new_latch(); AND1_out = latch AND oneHot;
                    next(latch) = AND1_out;  init(latch) = TRUE;
                assert (r AND (not AND1_out) AND (AND_out) );
                } else {
               allZero = allZero(enableMap);
                    latch = create_new_latch(); AND1_out = latch AND
allZero;
                    next(latch) = AND1_out;  init(latch) = TRUE;
                    assert (r AND AND1_out AND (not AND_out) );
                }
            } // end for loop on each trace signal
            // For cover verification original mode signals should be
        propagated
            for each mode condition "m" {
                latch = create_new_latch(); AND_out = cover_enable AND
latch;
                cover (m AND (AND_out) ); // Cover verification
            } // end for loop on each mode condition
        }
}
```

FIG. 6B

```
hierarchicalDecomposition(Template T) {
    for each entry in specification T {
        if (entry == mode_condition) {
            mode = getModeCondition(entry);
        }
        // if it refers to lower module specification
        if (entry == sub_template_reference) {
            Template t =  getLowerTemplate (entry);
            hierarchicalDecomposition (t);
            virtual_trace_array =  trace_array (t);
            // Create conditional cut point
            NEW_PIs = create_new_stutter_PIs (trace_array.size);
            virtual_trace_array = mux (enable, virtual_trace_signal,
            NEW_PIs);
            addTraceSignal (T, virtual_trace_array, mode, enable=1);
            createSafetyChecks (t, virtual_trace_signal, enable=0);
        }
        if (entry == trace_signal)  {
            addTraceSignal(T, trace_signal, mode);
        }
    }  // end of For loop
}
hierarchicalDecomposition(T);
createSafetyChecks(T);
createCoverChecks(T);
!
!
```

SCALABLE CONNECTIVITY VERIFICATION USING CONDITIONAL CUT-POINTS

DOMESTIC PRIORITY

This application is a continuation of U.S. patent application Ser. No. 15/922,272, filed Mar. 15, 2018, the disclosure of which is incorporated by reference herein in its entirety.

BACKGROUND

The present invention relates to semiconductor design. More specifically, the present invention relates to methods and systems for verifying semiconductor designs using hardware description language.

When designing an integrated circuit device it is desirable to test the integrated circuit by inputting signals and determining if the correct output signal is generated. This can occur both on externally available signal locations (such as the pins of an integrated circuit) and internally within the integrated circuit. Within an integrated circuit, areas of an integrated circuit can be divided into "blocks." It is then determined if signals travel to and from various blocks within a specified design time. This can be called connectivity verification because one is determining whether each block within the integrated circuit device is correctly connected to other blocks within the integrated circuit device. A "trace bus" is a common logic component verified using connectivity verification, propagation certain signals of a chip to certain endpoints where they can be read to on-chip evaluation circuits or even read out of the chip for analysis.

Connectivity verification is often decomposed into two portions fail verification and cover verification. Fail verification checks for the correct propagation of signals under a specified mode condition. Cover verification checks for the ability to initialization logic to sensitize a given mode condition. While decomposing connectivity verification into two portions enables greater scalability, it can become time consuming because it requires two different checks to occur. Issues also can occur when one signal is present in the cone of influence of another signal being checked.

SUMMARY

One or more embodiments of the invention provide a method for performing connectivity verification of an integrated circuit device. In embodiments of the invention, the method includes creating a directed graph representation of integrated circuit device. The method can further include determining target gates within integrated circuit device. The method can further include creating a hierarchical representation of trace signals and determining nested trace signals. The method can further include determining one or more locations for cut points for non-nested trace signals. Thereafter, performing connectivity verification using the one or more locations for cut points.

One or more embodiments of the invention provide a method for performing connectivity verification of an integrated circuit device. In embodiments of the invention, the method includes receiving a mode condition for each entry in the hardware specification. The method further includes determining if a lower module is referred to for each entry. In the event that a lower module specification is present, a conditional cut point at the entry is created. Thereafter, performing connectivity verification using the one or more locations for cut points.

One or more embodiments of the invention provide a computer program product for performing connectivity verification of an integrated circuit device. In embodiments of the invention, the computer program product includes a computer-readable storage medium having program instructions embodied therewith, wherein the computer-readable storage medium is not a transitory signal per se. The program instructions are readable by a processor system to cause the processor system to perform a method. The method includes creating a directed graph representation of integrated circuit device. The method can further include determining target gates within integrated circuit device. The method can further include creating a hierarchical representation of trace signals and determining nested trace signals. The method can further include determining one or more locations for cut points for non-nested trace signals. Thereafter, performing connectivity verification using the one or more locations for cut points.

BRIEF DESCRIPTION OF THE DRAWINGS

The subject matter of embodiments is particularly pointed out and distinctly defined in the claims at the conclusion of the specification. The foregoing and other features and advantages are apparent from the following detailed description taken in conjunction with the accompanying drawings in which:

FIG. 3 depicts pseudocode of one or more embodiments;

FIG. 4 depicts pseudocode of one or more embodiments;

FIG. 5 depicts pseudocode of one or more embodiments;

FIG. 6A depicts pseudocode of one or more embodiments;

FIG. 6B depicts pseudocode of one or more embodiments;

FIG. 7 depicts pseudocode of one or more embodiments;

DETAILED DESCRIPTION

During the design phase, testing of an integrated circuit can involve the creation of templates to verify the operation of each block and the connectivity between blocks. A connectivity verification tool generates structural, behavioral, and temporal connectivity checks to verify the connectivity implementation meets specifications. The source signal is commonly known as a trace signal while the sink signal is commonly known as the debug bus or trace array. The condition under which the reachability of source to sink being checked is commonly known as a mode condition. Each signal referenced in the mode condition is a mode signal.

The verification process involves inputting trace signals and determining if the trace array has the correct result. There can be "cut points" in the trace signal list as well as the configuration registers. These can specify mode conditions that control which trace signals are propagated through the trace bus. These configuration/mode latches can contain a large amount of initialization logic in order to select among various internal trace signals to be analyzed by an on-chip evaluation circuit.

This functionality allows one to observe transient events in a running integrated circuit device (or "chip"). In contrast, a scan-based analysis requires the chip to temporarily suspend functional operation while scanning. The logic being sampled by the trace signals also tends to have a large fan-in (number of inputs), and possibly very sequentially deep behavior. In addition, as the initialization logic for mode/ configuration latches is significant, it is better to use non-deterministic cut points on configuration latches to verify reachability of a trace signal at trace bus.

Thus, the verification process has been decomposed into two portions: 1) FAIL verification, where the correct propagation of a trace signal to trace array under the specified mode condition is determined, in which both driving logic for trace signal and configuration latches (including their initialization logic) are determined. Introducing non-determinism at mode signals over-approximates the mode conditions so that it will enable checking the reachability of trace signals for all the mode conditions described in the specification. 2) COVER verification, where the ability of the initialization logic to sensitize the necessary mode condition are tested by keeping the configuration latches and their initialization logic intact. Decomposing the verification problem into two enables much more scalable individual verification problems.

Figure 1:
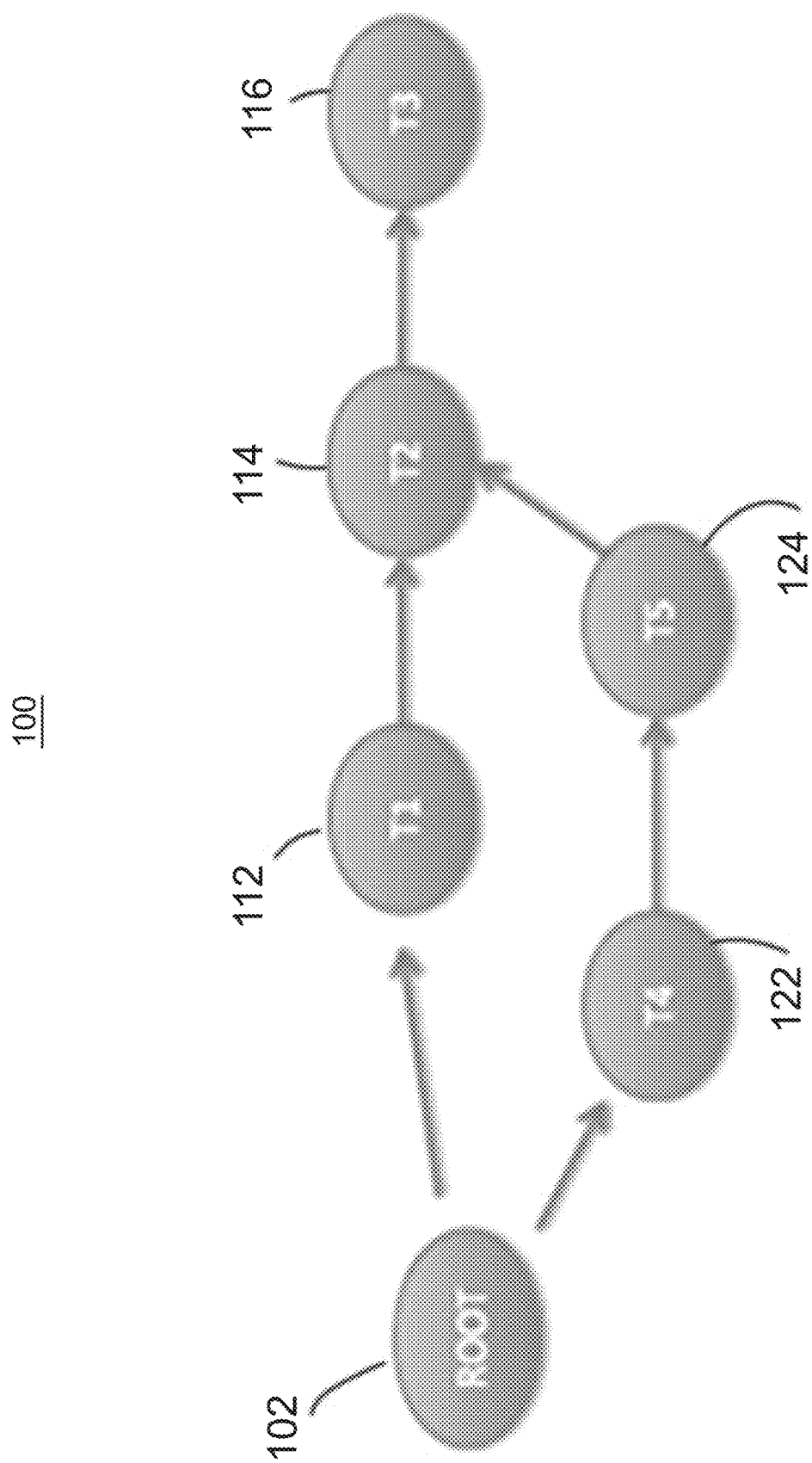
FIG. 1 depicts a block diagram illustrating dependencies between blocks being tested.

Turning now to a more detailed description of technologies that are more specifically relevant to aspects of embodiments of the present invention, an issue that can occur during is that two separate test bench builds would be created and executed, one for each of the two portions. It can be a time consuming process to create and execute two separate test bench builds. In addition, there is a possibility of a trace collision problem. A trace collision problem occurs when cutting one trace signal can disturb the logic for another trace signal. With reference to FIG. 1, a block diagram of such a situation is presented.

Process 100 illustrates the origin 102 of trace signals that are in the fan-in input to blocks 112 and 122. The output of block 112 is input to block 114, so it is considered a fan-in of block 114. Similarly, the output of block 122 is a fan-in of block 24. The output of block 124 also is a fan-in of block 114. So block 114 has two dependencies, block 112 and block 124. Because the output of block 114 is a fan-in of block 116, block 116 has input dependencies on each of the blocks 112, 114, 122, and 124. While such a situation can be common, the result is that a tester cannot cut a trace signal without disturbing the logic for inputs of other blocks. This can be termed a trace collision problem.

One method to avoid such problem is not to cut any of the trace signals. However, the verification task may then require not only the large amount of logic implementing the debug buses, but all the original design logic affecting these monitored trace signals—which can be much larger still and require a very large sequential depth for exhaustive verification. In practice, this becomes prohibitively expensive for verification because exhaustive analysis of the arbitrary logic driving these cut points can be arbitrarily difficult. It is worth noting that there exist automated algorithms for simplifying a verification task by identifying logic irrelevant to a given property, and inserting cut points to irrelevant logic. When importing the full design without any cut points, these techniques are, in practice, highly impractical for this problem because cut point insertion uses dedicated formal analysis for every property, and connectivity verification test benches often have many thousands of individual properties, often spanning the majority of the logic in a chip. Without test bench-level cut pointing, the verification task can become thousands of times slower.

Another alternative is to selectively not insert cut points, in case a trace collision problem is found: i.e., inserting cut points at every trace signal, and if any of the verification runs fail, to post-process looking for nested cut points and to re-run verification of the failed properties without the nested cut points. However, this alternative means that more than one verification run is used to make progress with the verification. In the worst case, a separate model build and import per property would be used, which would greatly increase the overall verification resources.

Turning now to an overview of one or more embodiments of the invention, a method of verifying connectivity using conditional cut points is presented. In addition, a method for verifying connectivity by decomposing the hierarchy using conditional cut points is also presented.

As discussed above, one issue that can occur is that one might be interested to see if signals from block 114 reach a specified block (after block 116, not illustrated). However, that might be difficult because signals from block 114 have to propagate through block 116 first. In addition, signals from block 114 have dependencies from block 112, block 122, and block 124. One might want to use a cut point to test block 114 separately from blocks 112, 122, 124, and 116. However, such a cut point might not operate correctly due to the dependencies between blocks 112, 114, 116, 122, and 124. One would have to include all the logic for the other blocks just in order to determine if block 114 is operating as intended.

Figure 9:
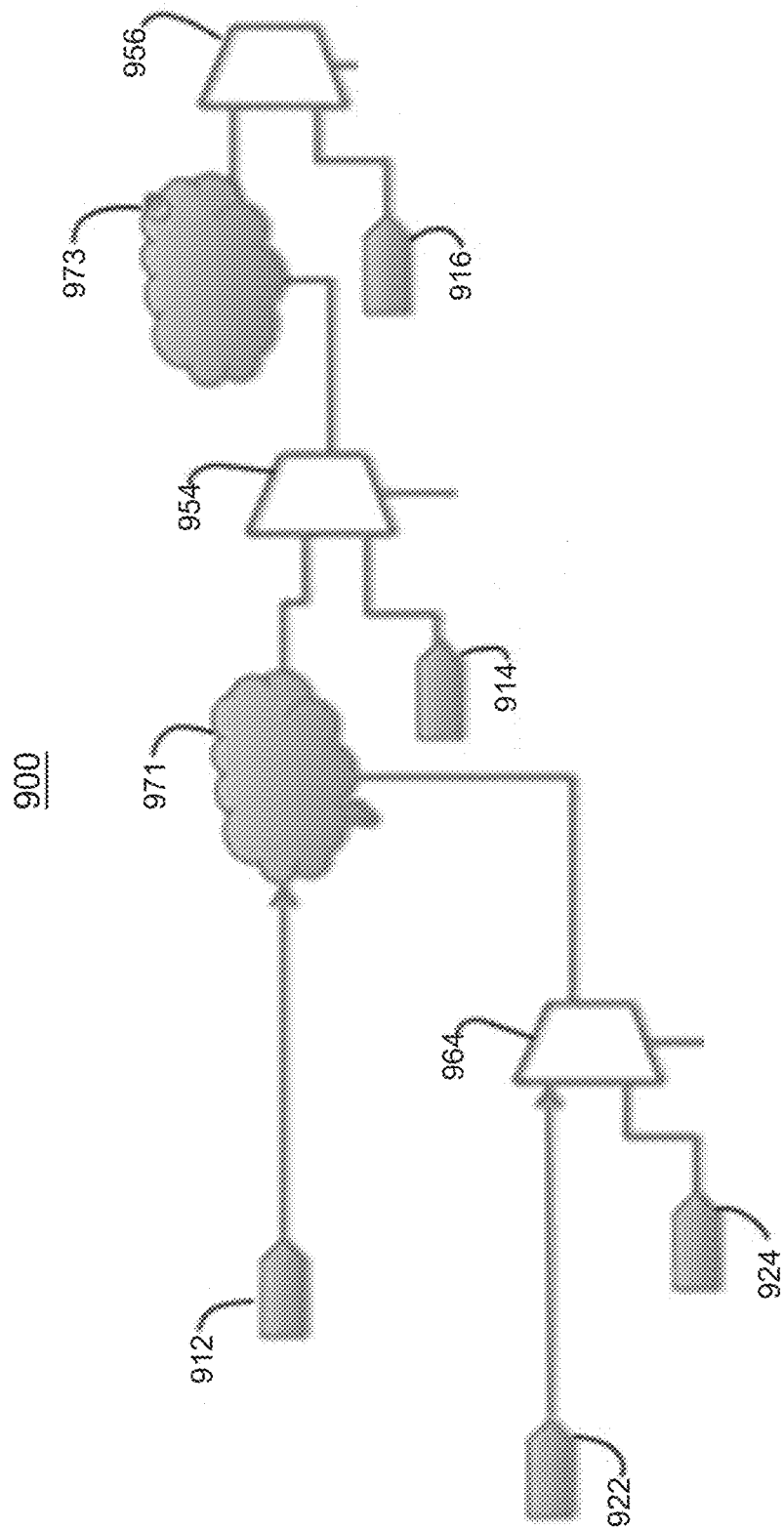
FIG. 9 depicts a block diagram illustrating conditional overrides of one or more embodiments.

With reference to FIG. 9, conditional cut points can be used to solve such a problem. Block diagram 900 illustrates the same situation illustrated with respect to block diagram 100 of FIG. 1. As such, the last two digits of the reference number will be the same for FIG. 1 and FIG. 9 if the points are the same. Blocks 912 and 922 correspond generally to block 112 and 122 of FIG. 1.

Using the conditional cut point algorithms described herein, one is able to set a cut point without having to worry about other inputs to a certain block. For example, as discussed above, block 114 has an input dependency on blocks 112, 122, and 124. Under normal circumstances, block 114 cannot be tested without also testing blocks 122, and 124. With respect to FIG. 9, a multiplexer 954 is illustrated. The inputs to multiplexer (also known as a "mux") 954 are the cut point for block 914 and a cloud 971. Cloud 971 represents the fan input or other inputs to block 914. If one were performing a full test of all the blocks, one would set mux 954 such that it receives the input from cloud 971. However, if one were only interested in performing connectivity verification of block 914, one would set mux 954 such that it only receives the input from block 914. In this manner, one would be assuming that the blocks 922, and 924 were all propagating signals correctly to block 914. This can occur if one had already tested blocks 922, 924, and 912. Since one is only testing block 914 in this example, the tester is only concerned with the behavior of block 914 and would not have to perform connectivity testing of block 922, and 924 at the same time. Thus, prior to performing a connectivity verification, one would perform a static analysis of the design to determine a dependency graph such as block diagram 100 and insert conditional cutpoints with muxes as in 900.

Figure 10:
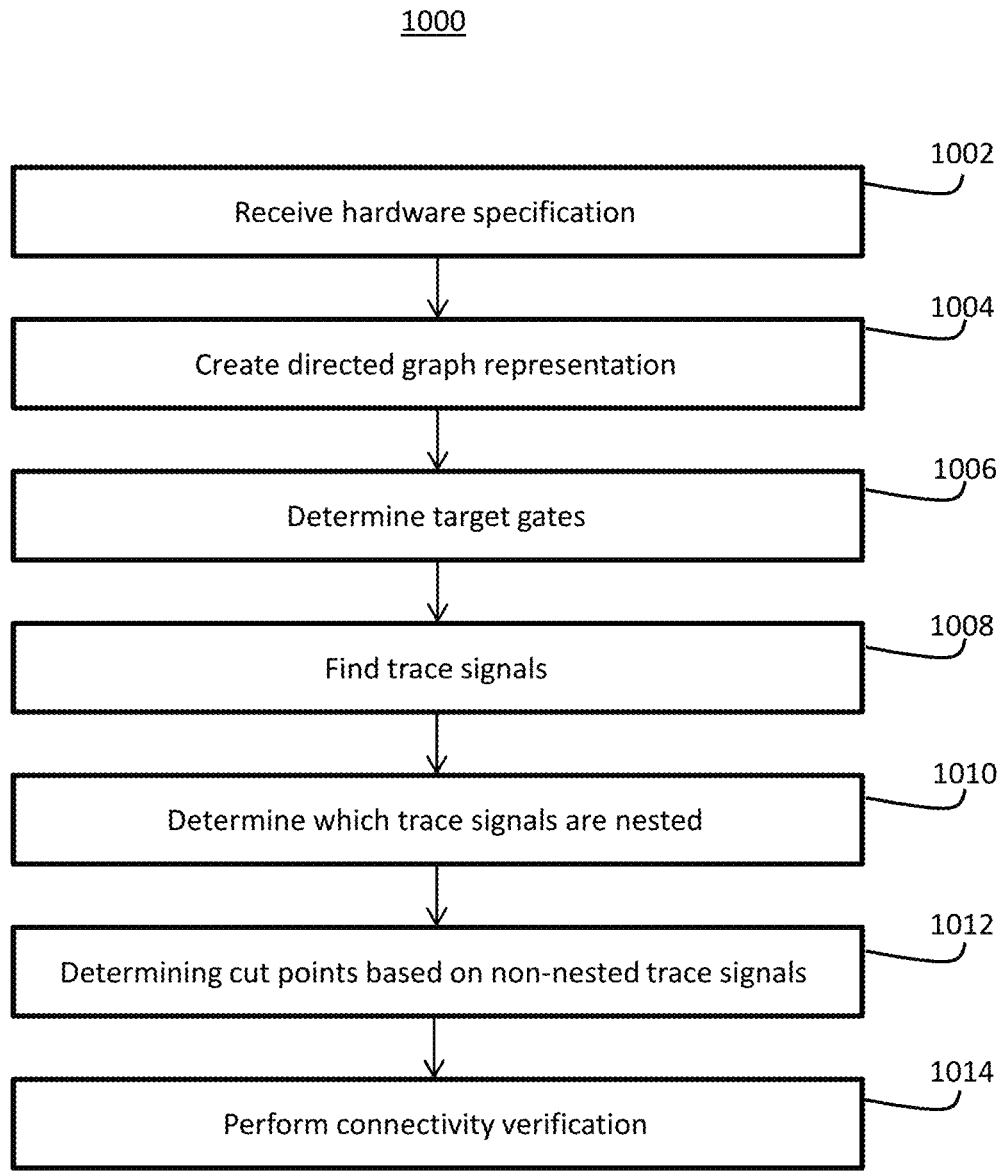
FIG. 10 depicts a flow diagram of one or more embodiments.

A flowchart illustrating method 1000 is presented in FIG. 10. Method 1000 is merely exemplary and is not limited to the embodiments presented herein. Method 1000 can be employed in many different embodiments or examples not specifically depicted or described herein. In some embodiments, the procedures, processes, and/or activities of method 1000 can be performed in the order presented. In other embodiments, one or more of the procedures, processes, and/or activities of method 1000 can be combined or skipped. In one or more embodiments, method 1000 is performed by a processor as it is executing instructions.

We first receive a hardware specification which is typically entered in RTL (Register Transfer Level) or behavioral VHDL or Verilog (block 1002). This offers a high level representation of a logic design from which lower-level representations, and ultimately actual wiring, can be derived through such a logic synthesis. Hardware generally consists of sequential and combinational logic. Sequential logic is represented using latches, registers, and RAM. Registers synchronize the circuit's computations to clock signal levels and transitions and can hold values to allow the circuit to be state-holding. Combinational logic performs transformations on the data values, implementing the logic functions of the circuit.

We next define our netlist format and create a directed graph (block 1004). A netlist is a lower level representation of the circuit. A netlist contains a finite directed graph with vertices representing gates, and edges representing interconnections between those gates. The gates have associated functions, such as constants, primary inputs (hereafter referred to as RANDOM gates), combinational logic such as AND gates, OR gates, NOR gates, NAND gates, XOR gates, XNOR gates, and the like, and sequential elements (hereafter referred to as registers). Registers can have two associated components: their next-state functions, and their initial-value functions. Both are represented as other gates in the graph. Semantically, for a given register, the value appearing at its initial-value gate at time "0" ("initialization" or "reset" time) will be applied as the value of the register itself; the value appearing at its next-state function gate at time "i" will be applied to the register itself at time "i+1". A set of valuations to all registers in a netlist is called a "state". A time step in verification is sometimes referred to as a "cycle", as is a convention from cycle simulators.

A trace refers to a representation of a sequence of netlist evaluation, starting from an initial state and with gate evaluations and transitions consistent with the netlist semantics. A trace witnessing a property failure is sometimes referred to as a "counterexample."

Certain gates can be labeled "targets" (block 1006). Targets correlate to safety or cover properties, where the goal of the verification process is to find a way to drive a logical "1" value to a target or to prove that no such assertion of the target is possible.

One may reason about a netlist using two-valued Boolean reasoning, where RANDOM gates take nondeterministic Boolean values and other gates evaluate in the standard manner, or three-valued reasoning which adds to the Boolean 0, 1 a ternary "X" value usually representing an unknown value.

Figure 2:
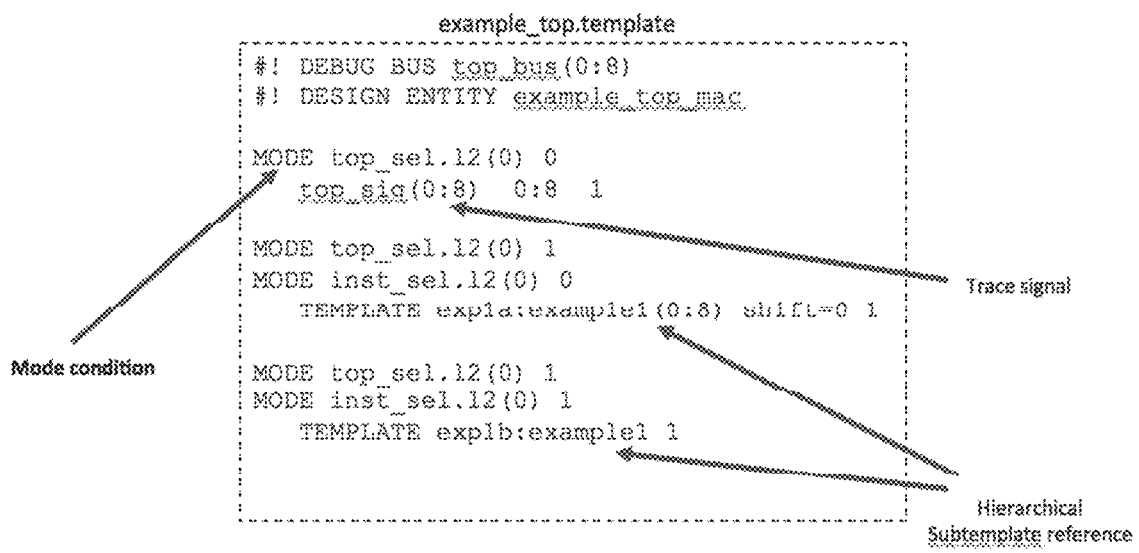
FIG. 2 depicts pseudocode of one or more embodiments.

The trace signals are collected in a hierarchical manner (block 1008). This is depicted in pseudocode in FIG. 2, which represents an exemplary template specification. The signal top_sig is a trace signal and exp 1a and exp 1b are sub-template references. The lower level trace signals specified in exp 1a and exp 1b are collected accordingly in a recursive fashion.

Once the trace signal list is retrieved, nested trace signals are detected (block 1010). Pseudocode illustrating one method of detecting overlapping or nested trace signals is presented in FIG. 3. First, an iterative DFS (Depth-First-Search) fan-out traversal (using the algorithm presented as pseudocode in FIG. 4) is performed on each trace signal of the design. Thereafter, a graph is created where each node is a trace signal, and each edge indicates a fan out connection from one trace signal to another (block 1012). The graph can be similar to that presented with respect to FIG. 1. Nodes whose only incoming edge is sourced by the "Root" (element 102) reflect non-nested trace signals. This is illustrated in pseudocode form in FIG. 5. These are safe candidates for placing a cut point. Once the cut point locations are found, one can begin connectivity testing (block 1014). One can also determine locations for conditional cut points based on the nested trace signals. Once connectivity testing is complete and the integrated circuit device passes, fabrication of the integrated circuit device can begin. The finalized design of the integrated circuit is sent to a fabrication facility, where the integrated circuit is finalized in silicon and associated packaging. Thereafter, the integrated circuit device can be used in an electronic device.

The algorithm presented as pseudocode in FIGS. 6A and 6B represent an exemplary full verification flow, utilizing each of the algorithms presented in FIGS. 2-5. FIG. 6B is a continuation of the pseudocode from FIG. 6A. The conditional cut point comprises a nondeterministic "stuttering input." A stuttering input is a gate whose value can change only once per clock period. The stuttering input is driven only under a specific condition, otherwise, the original logic is propagated. A graphical representation of such a conditional cut point was described earlier with respect to FIG. 9.

Once a trace signal dependency graph is created for the top-level template, FAIL or COVER properties are created in one of two different methods. In method 1, for each mode condition, all the trace signals that are propagated under that mode condition are enumerated (block 1012). In this method, cut points are created only for non-nested trace signals. Non-nested trace signals are nodes whose only incoming edge in the global graph are "root", such as block 112 of FIG. 1. Here, the cut-point is a nondeterministic stuttering input. For each of the mode signals, a conditional cut point is created such that for FAIL verification, a nondeterministic constant (i.e., a "chicken switch" or randomly-initialized latch that can never toggle) will be propagated through the MUX, whereas for COVER verification (where reachability of the mode condition is checked), its original behavior will be preserved.

In method 2, a FAIL property is formed for each of trace signal separately (block 1014). For all the mode conditions under which a trace signal is involved, a property is formed to make sure that the trace signal will be propagated to the correct endpoint (as per the specified mode condition) of the debug bus. In this method, conditional cut points are created on all the nested trace signals, i.e., those whose edges are not directly connected to the root (such as each of blocks 114, 116, and 124 from FIG. 1) (block 1016). For the non-nested trace signals, unconditional cut points are introduced similar to method 1. Again, cut-pointing on trace signals is done using nondeterministic "stuttering inputs".

The COVER verification is performed in the same way as described in method 1—mode signals are not cut-pointed for COVER properties but are nondeterministic constants for FAIL properties.

In method 1, the number of FAIL properties is one per mode condition in the template, whereas, in method 2, the number of FAIL properties is one per trace signal. Each method has its advantage in terms of ability to debug and verification resources.

In some instances, one does not wish to work with a flattened mode of analysis of the blocks of an integrated circuit device. In some instances, one wants to evaluate the blocks in a hierarchical manner.

Figure 8:
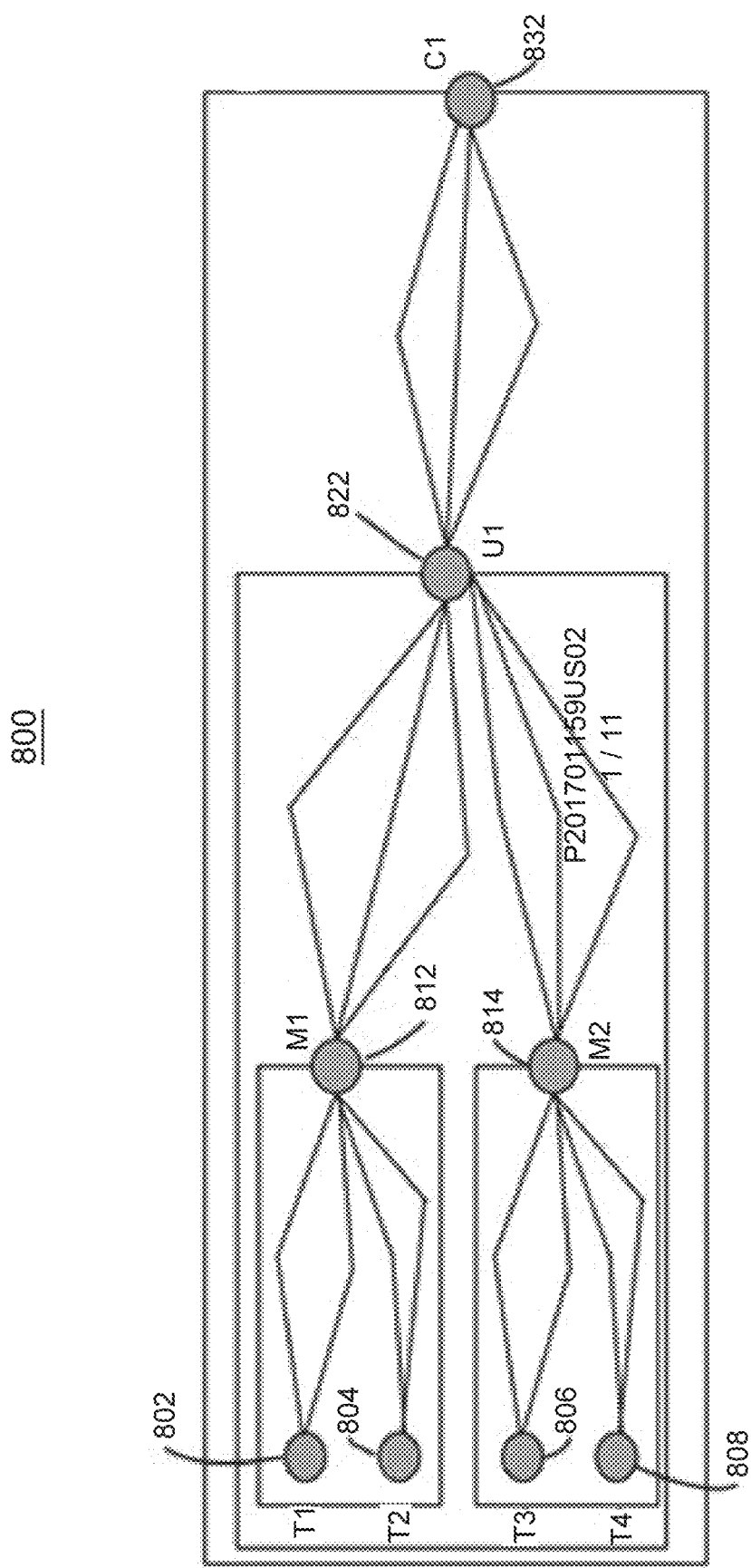
FIG. 8 depicts a block diagram illustrating decomposition based connectivity verification of one or more embodiments.

Referring now to FIG. 8, a block diagram 800 illustrating an exemplary hierarchically decomposed connectivity verification. Block diagram is a hierarchy of computing blocks. Block 802, 804, 806, and 808 are at one level. This could be, for example, the leaf level. Above them are blocks 812 and 814. This could be, for example, the block level. At another level above that is block 822. This could be, for example, the unit level. At another level above that is block 832. This could be, for example, the core level.

There are multiple paths between each level. For example, there are two paths between block 802 and 812. There are two paths between block 804 and 812. There are three paths between block 812 and block 822. In the past, in order to determine if there is connectivity between block 802 and block 822, one must test each possible path between block 802 and block 822. That is, each of the two paths between block 802 and block 812 must be tested in conjunction with each path between 812 and block 822. That means 6 paths must be tested. In order to test the connection between blocks 802 and block 832, one most test each of those 6 paths 3 times (once for each path between block 822 and block 832). These 18 tests would also have to be conducted for block 804, 806, and 808. It should be remembered that FIG. 8 is a greatly simplified block diagram. An actual block diagram of an actual integrated circuit device can contain dozens of different blocks with many different levels, resulting in hundreds, thousands, or millions of different paths on which to perform connectivity verification.

However, given the capability to insert conditional cut points, described above with respect to FIG. 6, embodiments described herein illustrate a framework suitable for hierarchical decomposition and thus greater scalability.

For example, at block 812, 814, or 822, a conditional cut point can be introduced, allowing checking each entity (block 802, 804, 806, or 808) independently for FAIL properties. Point 812 can be considered a sub-template. For verification of sub-template 812, FAIL properties are formed between 802 to 812 and 804 to 812 and for these properties, the behavior of the original net 812 will be propagated. Whereas for the higher level template verification at block 822, a new primary input M1' will be propagated (from block 812 to block 822 to U1) through the conditional cut point. Each line between different points (e.g., there are two lines between block 802 and block 812) represent different mode conditions under which signal T1 can propagate to M1. The cut-pointing and trace collision problems discussed in Algorithm 5 are directly applicable here also. Therefore, once one path between block 802 and block 812 is confirmed, the other paths do not have to be tested to test connectivity between block 802 and block 822. Similarly, once at least one path between block 822 and block 832 is confirmed, the other paths do not need testing. In other words, only one connectivity test need be performed from block 802 to block 832, once the intermediate paths in the hierarchy are tested.

With respect to FIG. 7, pseudocode illustrating an algorithm illustrating a hierarchical decomposition-based connectivity verification framework is presented. In contrast to the flattened mode, with hierarchical decomposition, FAIL properties are self-contained with respect to each template file, often located within a single design entity. In other words, paths are not concatenated across templates to span logic entities often across across a core.

Although the FAIL verification has been decomposed into smaller segments, in order to guarantee that the signal from block 802 can reach block 832, COVER checks can be utilized for proper sensitization of full mode condition across all entities—otherwise, the hierarchically decomposed FAIL check may not find an incompatible sensitization across entities. Therefore, cover checks are still performed in flattened mode.

Figure 11:
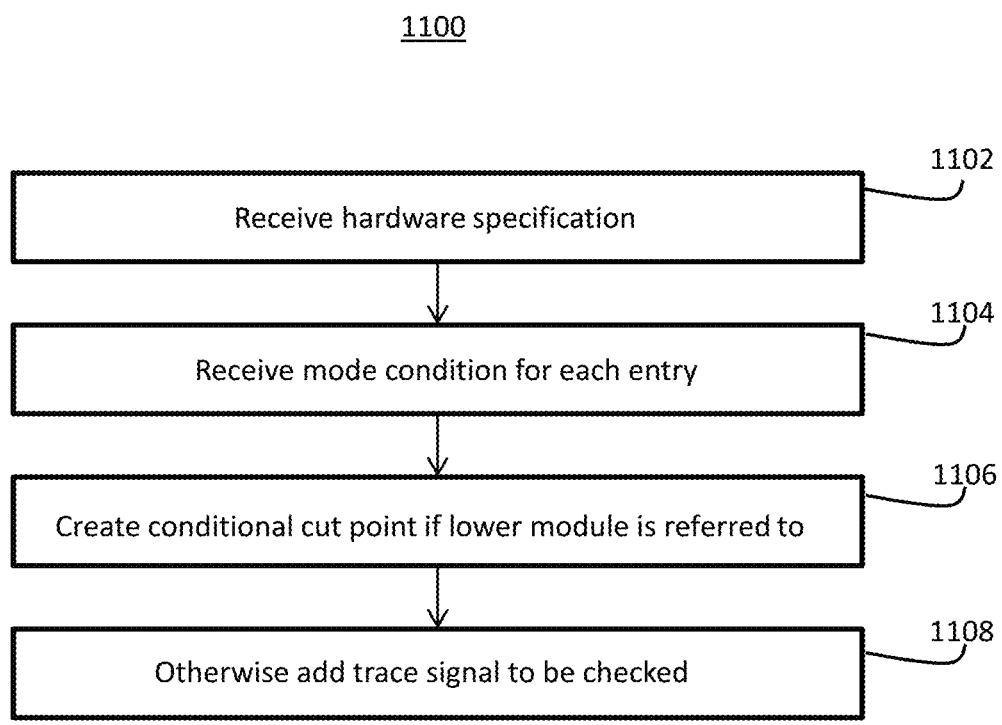
FIG. 11 depicts a flow diagram of one or more embodiments.

A flowchart illustrating method 1100 is presented in FIG. 11. Method 1100 is merely exemplary and is not limited to the embodiments presented herein. Method 1100 can be employed in many different embodiments or examples not specifically depicted or described herein. In some embodiments, the procedures, processes, and/or activities of method 1100 can be performed in the order presented. In other embodiments, one or more of the procedures, processes, and/or activities of method 1100 can be combined or skipped. In one or more embodiments, method 1100 is performed by a processor as it is executing instructions.

A hardware specification is received (block 1102). As above, this can be entered in RTL or behavioral VHDL or Verilog or similar format. This offers a high level representation of a logic design from which lower-level representations, and ultimately actual wiring, can be derived through such a logic synthesis. For each entry in the specification, a mode condition is retrieved (block 1104). If a lower module specification is referred to, a conditional cut point is created (block 1106). If the entry is instead a trace signal, the trace signal is added to the list to be checked (block 1108). Thereafter, methods such as those described above with respect to FIG. 10 can be performed to perform a connectivity verification.

Fabrication foundries ("fabs") can manufacture integrated circuit devices based on the design layouts (such as those created using one or more embodiments) using a photolithographic process. Photolithography is an optical printing and fabrication process by which patterns on a photolithographic mask (also known as a photomask) are imaged and defined onto a photosensitive layer coating a substrate. To fabricate an integrated circuit device, photomasks as created using the integrated circuit design layout as a template. The photomasks contain the various geometries (i.e., features) of the integrated circuit design layout. The various geometries contained on the photomasks correspond to the various base physical integrated circuit elements that comprise functional circuit components of n integrated circuit, such as transistor, interconnect wiring, via pads, as well as other elements that are not functional circuit elements, but that are used to facilitate, enhance, or track various manufacturing processes. Through sequential use of the various photomasks corresponding to a given integrated circuit in a fabrication process, a large number of material layers of various shapes and thicknesses, with various conductive and insulating processes, may be built up to form the overall integrated circuit and the circuits within the integrated circuit design layout.

Various embodiments of the present invention are described herein with reference to the related drawings. Alternative embodiments can be devised without departing from the scope of embodiments of the present invention. It is noted that various connections and positional relationships (e.g., over, below, adjacent, etc.) are set forth between elements in the following description and in the drawings. These connections and/or positional relationships, unless specified otherwise, can be direct or indirect, and embodiments of the present invention are not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted that the term "selective to," such as, for example, "a first element selective to a second element," means that the first element can be etched and the second element can act as an etch stop.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for performing connectivity verification of an integrated circuit device, the method comprising:
   determining target gates within the integrated circuit device;
   finding trace signals within the integrated circuit device;
   determining nested trace signals of the trace signals;
   determining one or more locations on the integrated circuit device for cut points for non-nested trace signals of the trace signals; and
   performing connectivity verification using the one or more locations for the cut points.

2. The method of claim 1, further comprising:
   creating a conditional cut point for each nested trace signal of the trace signals.

3. The method of claim 2, further comprising:
   placing a multiplexer at one or more of the conditional cut points; and
   performing connectivity verification at the conditional cut point of said each nested trace signal.

4. The method of claim 3, wherein:
   the multiplexer is configured with two inputs such that a nondeterministic constant is at a first input and a signal input into the multiplexer is a second input.

5. The method of claim 1, further comprising:
   creating a directed graph representation of the integrated circuit device by defining blocks of the integrated circuit device; and
   determining interconnections of the blocks.

6. The method of claim 5, wherein:
   the blocks are chosen from registers, AND gates, OR gates, NOR gates, NAND gates, XOR gates, constants, and primary input gates.

7. The method of claim 5, wherein:
the determining nested trace signals comprises performing an iterative depth first search fan-out traversal of trace signals from the directed graph representation.

8. The method of claim 7, further comprising:
creating a graph wherein nodes of the graph are trace signals and edges of the graph are connections from one trace signal to another trace signal of the trace signals.

9. The method of claim 1, wherein:
the connectivity verification is configured to verify proper propagation of signals between blocks within the integrated circuit device.

10. The method of claim 1, wherein:
the performing connectivity verification comprises FAIL verification configured to check for correct propagation of a trace signal to a trace array.

11. The method of claim 1, wherein:
the performing connectivity verification comprises COVER verification configured to check for the ability of initialization logic to sensitize a mode condition.

12. A method for performing connectivity verification of an integrated circuit device, the method comprising:
receiving a mode condition for each entry in a hardware specification of the integrated circuit device;
determining whether a lower module is referred to for each entry of a plurality of entries;
based on determining that a lower module specification is present at an entry of the plurality of entries, creating a conditional cut point at said entry; and
performing connectivity verification using one or more locations on the integrated circuit device for cut points for non-nested trace signals.

13. The method of claim 12, further comprising:
placing a multiplexer at one or more of the conditional cut points; and
performing connectivity verification at each conditional cut point of the one or more conditional cut points.

14. The method of claim 13, wherein:
the multiplexer is configured with two inputs such that a nondeterministic constant is at a first input and a signal input into the multiplexer is a second input.

15. The method of claim 12, further comprising:
creating a directed graph representation of integrated circuit device; and
determining nest trace signals.

16. The method of claim 15, wherein:
the creating the directed graph representation comprises defining blocks of the integrated circuit device; and
determining interconnections of the blocks.

17. The method of claim 16, wherein:
the blocks are chosen from registers, AND gates, OR gates, NOR gates, NAND gates, XOR gates, constants, and primary input gates.

18. The method of claim 15, wherein:
the determining nested trace signals comprises performing an iterative depth first search fan-out traversal of trace signals from the directed graph representation.

19. The method of claim 18, further comprising:
creating a graph wherein nodes of the graph are trace signals and edges of the graph are connections from one trace signal to another trace signal of the trace signals.

20. A computer program product for performing connectivity verification of an integrated circuit device, the computer program product comprising:
a computer-readable storage medium having program instructions embodied therewith, wherein the computer-readable storage medium is not a transitory signal per se, the program instructions readable by a processor system to cause the processor system to perform a method comprising:
receiving a hardware definition of the integrated circuit device;
determining target gates within the integrated circuit device;
finding trace signals within the integrated circuit device;
determining nested trace signals of the trace signals;
determining one or more locations on the integrated circuit device for cut points for non-nested trace signals of the trace signals; and
performing connectivity verification using the one or more locations for the cut points.

* * * * *